(No Model.) 3 Sheets—Sheet 2.
K. S. BLANCHARD.
FILTERING APPARATUS.

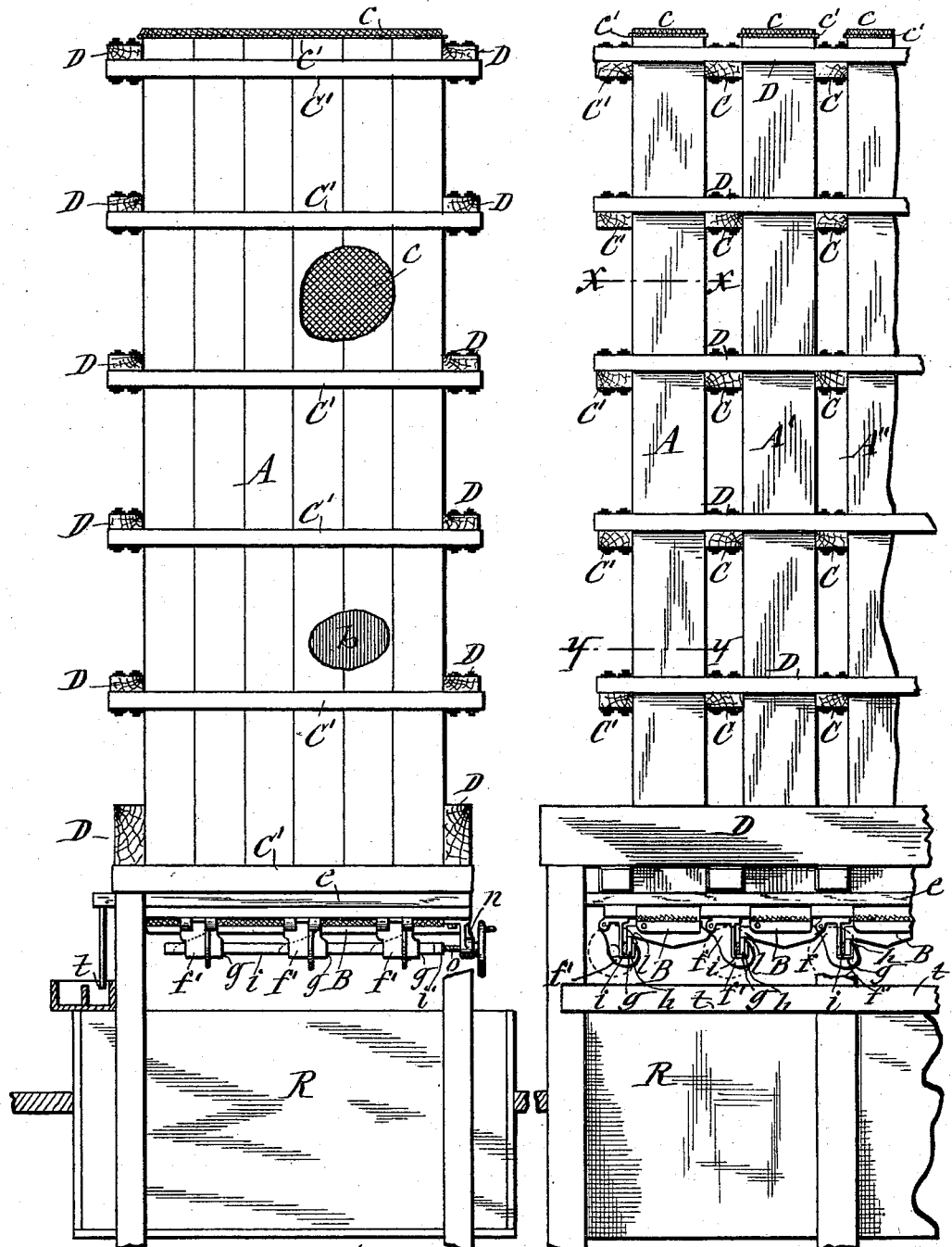

No. 572,672. Patented Dec. 8, 1896.

WITNESSES: INVENTOR:

(No Model.) 3 Sheets—Sheet 3.
K. S. BLANCHARD.
FILTERING APPARATUS.
No. 572,672. Patented Dec. 8, 1896.
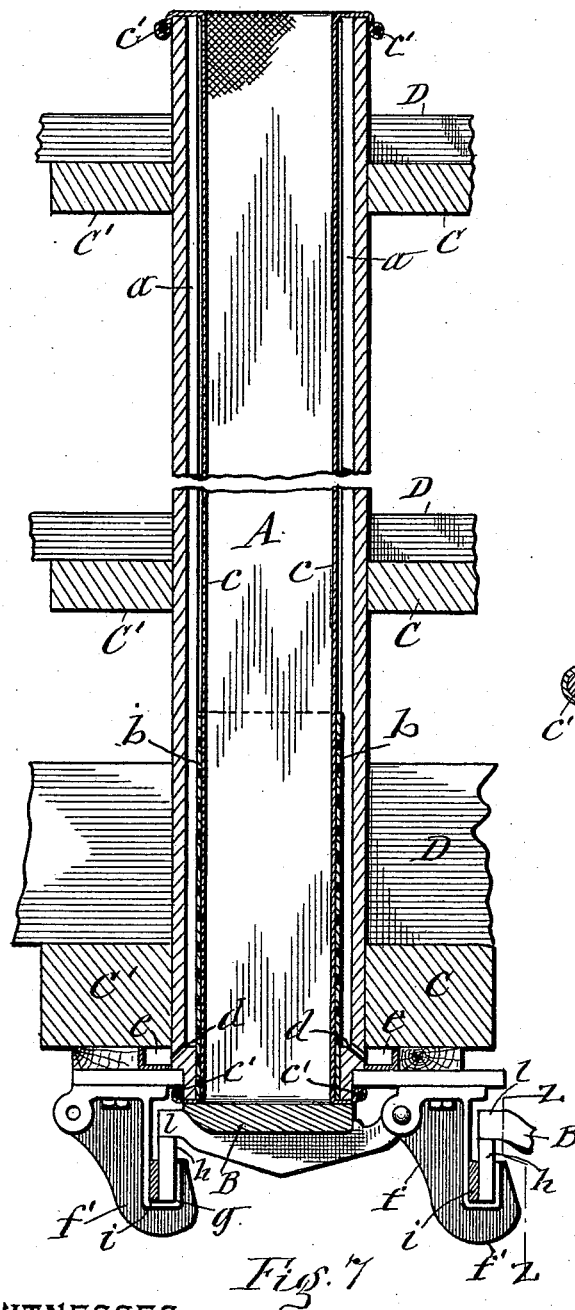
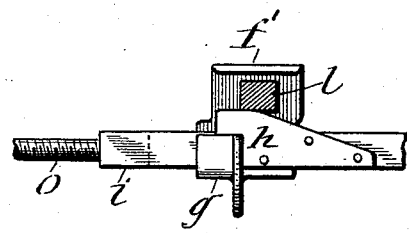
Fig. 8
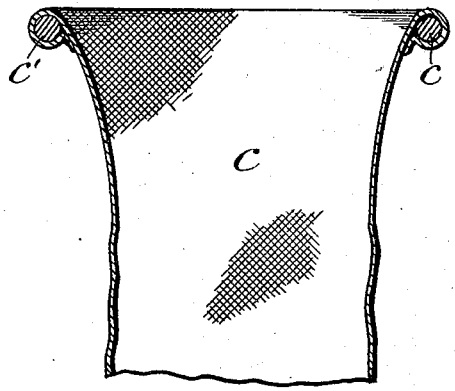
Fig. 9
Fig. 7
WITNESSES:
C. E. Tomlinson.
C. L. Bendixon
INVENTOR:
Kirk S. Blanchard
By E. Laass
his ATTORNEY

UNITED STATES PATENT OFFICE.

KIRK S. BLANCHARD, OF ALBION, NEW YORK, ASSIGNOR OF TWO-THIRDS TO RUFUS E. BOSCHERT, OF SYRACUSE, NEW YORK.

FILTERING APPARATUS.

SPECIFICATION forming part of Letters Patent No. 572,672, dated December 8, 1896.

Application filed November 4, 1895. Serial No. 567,792. (No model.)

*To all whom it may concern:*

Be it known that I, KIRK S. BLANCHARD, of Albion, in the county of Orleans, in the State of New York, have invented new and useful Improvements in Filtering Apparatus, of which the following, taken in connection with the accompanying drawings, is a full, clear, and exact description.

This invention is designed more particularly for filtering distillery-slop and brewers' grains.

In practice it has been found very difficult to successfully filter the aforesaid substances, so as to effectually separate the liquid from the solid particles, owing to slight specific gravity of the solid particles and their tendency to retain the liquid. These difficulties are effectually overcome by my present invention, which consists in certain novel features in the details of construction, substantially as hereinafter described, and particularly pointed out in the subjoined claims.

Figure 3:
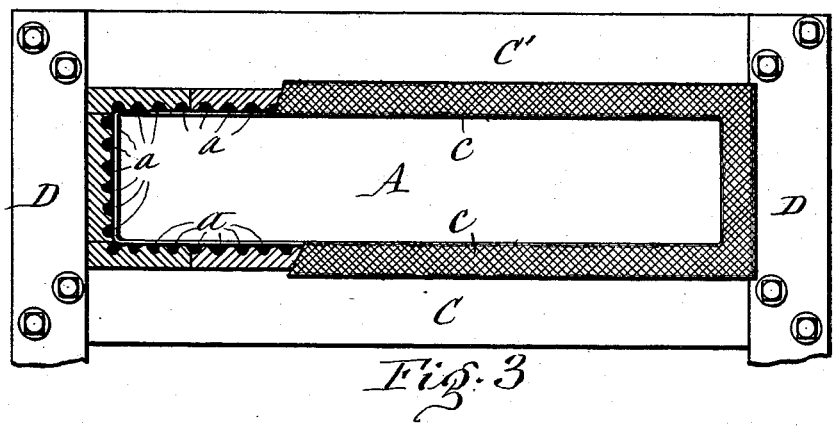
Figure 4:
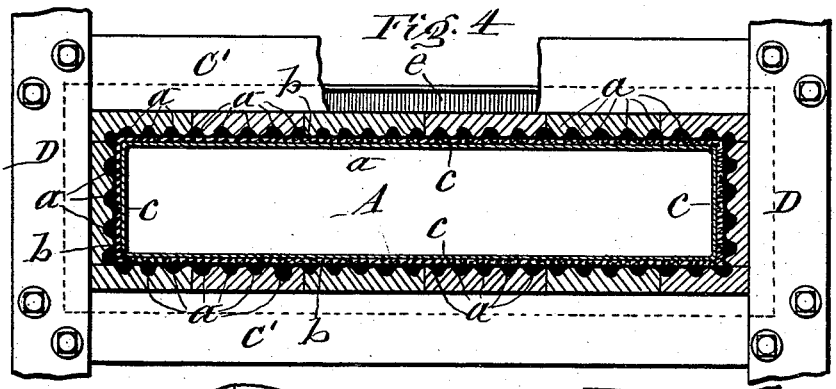
Figures 5, 6:
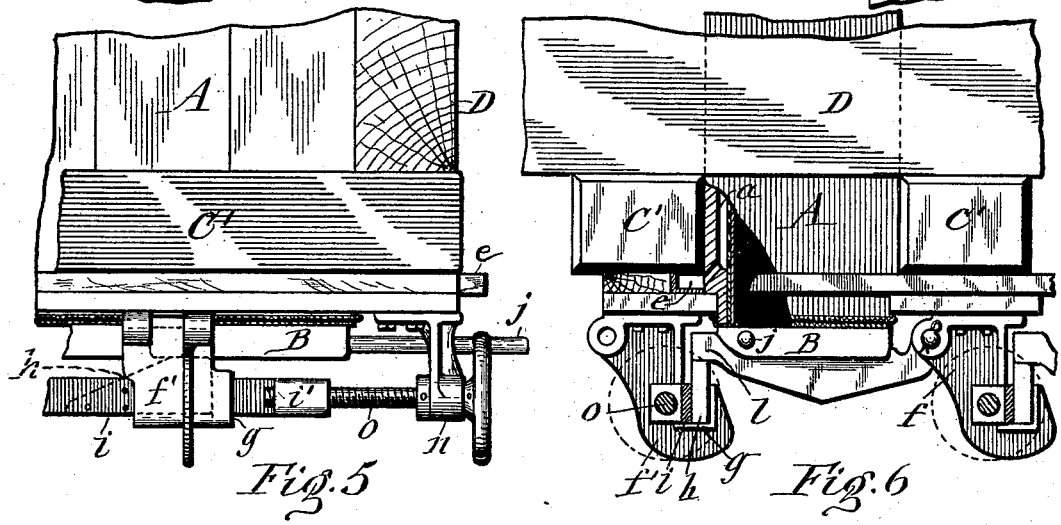

In the annexed drawings, Figures 1 and 2 are respectively side and end elevations of a filtering apparatus embodying my invention. Figs. 3 and 4 are horizontal transverse sections, respectively, on lines X X and Y Y in Fig. 2. Figs. 5 and 6 are enlarged side and end views of the lower portion of the filter. Fig. 7 is a vertical transverse section of the filter. Fig. 8 is a vertical sectional view on line Z Z in Fig. 7, and Fig. 9 is an enlarged sectional view of one end of the straining-cloth.

Similar letters of reference indicate corresponding parts.

A represents the filtering-tank, which is rectangular in its horizontal cross-section and formed with vertically-prolonged walls to obtain the requisite height for containing a deep body of substance to be filtered, and in order to effectually eliminate the liquid from said substance I form the tank A so as to bring the side walls thereof in proximity to each other, as clearly shown in Figs. 3, 4, and 7 of the drawings. By this construction I confine the substance under treatment in a comparatively thin vertically-disposed strata, and thus cause the liquid to be readily expelled from the center through opposite sides of the strata by gravity of the deep body of the substance.

The inner faces of the vertical walls of the tank are channeled vertically, as shown at $a\ a$, and across the channels is placed a suitable strainer consisting either of perforated sheet metal $b$ or of wire-cloth extending around the four walls of the tank and across the channels $a\ a$ to keep the latter open back of the strainer. Upon the said metallic strainer is placed a suitable straining-cloth $c$, which likewise extends around the four sides of the interior of the tank and overlaps the tops and bottoms of the vertical walls and has secured to each of its top and bottom edges a rope $c'$, which fastens the said straining-cloth to the tank by the stretching of said cloth across the ends of the four walls of the tank, so as to cause the ropes $c'\ c'$ to embrace the exterior of the tank. The object of this mode of securing the straining-cloth to the tank is to permit said cloth to be readily removed when required for cleaning or repairing the same. Said cloth is also drawn taut across the channels $a\ a$ to permit the expressed liquid to freely descend in said channels. The metallic strainer $b$ is employed to resist the pressure of the substance under treatment, and it therefore may extend only part way from the bottom of the tank upward, as shown in Fig. 7 of the drawings.

The channels $a\ a$ terminate with outward channels $d$ for the exit of the liquid escaping from the substance contained in the tank, said liquid descending in the vertical channels $a$ to the exits $d$. These exits communicate with a gutter $e$, which extends around the exterior of the base of the tank and empties into a trough $t$, which conducts the liquid to the sewer or other suitable place for receiving said liquid.

The base of the tank is provided with a movable bottom B for the discharge of the residuum of the filtered substance to a vat or other suitable receptacle R, located beneath the tank. Said bottom is preferably imperforate and hinged along one of its longitudinal edges to the brackets $f\ f$, attached to the base of one of the side walls of the tank.

The opposite edge of said bottom is provided with a suitable removable support which is adapted to sustain said bottom in its closed position and to allow it to drop into an open position, as may be desired.

To guard against too sudden discharge of the residuum of the filtered substance, I construct the aforesaid removable support of the bottom B of the tank as follows: To the base of the side wall of the tank at the free edge of the bottom B are firmly secured the brackets $f'$, which are formed with guides $g$, arranged linearly parallel with the bottom B. In each of said guides rides a wedge $h$, and all of said wedges are coupled together by a longitudinally-movable bar $i$, by which the wedges are moved simultaneously on the guides $g\ g$. By moving said bar in one direction the wedges $h\ h$ are withdrawn from under the lugs $l\ l$ on the bottom B, which is thus allowed to gradually descend and finally drop into its open position.

The bottom B is provided with a suitable handle $j$, by which to lift it, so as to allow the wedges $h\ h$ to enter under the lugs $l\ l$ and force the same upward to close the bottom B. In order to obtain perfect control of the coupling-bar $i$, I attach thereto a nut $i'$, in which works a screw $o$, which is parallel with the coupling-bar and journaled in a bracket $n$, affixed to the base of the tank, as more clearly shown in Fig. 5 of the drawings.

In practice I employ a plurality of tanks A A' A'', &c., placed parallel side by side, as illustrated in Fig. 2 of the drawings, and in order to promptly brace the sides of each tank and sustain the tanks in their respective positions I interpose between the successive tanks longitudinal beams C C and place against the outer sides of the outer or first and last tanks similar longitudinal beams C' C' and tie all of said beams together by transverse beams D D, placed against the ends of the set of tanks and firmly secured to the longitudinal beams. In this manner I obtain an extensive apparatus of superior efficiency for filtering distillery-slop and brewers' grain.

What I claim as my invention is—

1. The combination with the side walls of a filtering-tank, of a bottom therefor hinged at one side, a guide at the other side of said bottom, and a wedge movable on said guide and engaging said bottom, to sustain the latter in closed position and cause it to open gradually, as set forth.

2. The combination with the side walls of a filtering-tank, of a bottom hinged at one edge to the base of one of said side walls, guides under the base of the opposite side wall, wedges sliding in said guides and sustaining said bottom in its closed position, and a longitudinally-movable rod connected to the wedges to operate them simultaneously, as set forth.

3. The improved filtering-tank formed with vertically-prolonged walls and having the two side walls thereof in proximity to each other, the inner faces of said walls being channeled vertically and covered by strainers extending straight across the channels, liquid-exits extending outward from the bases of the channels, an imperforate bottom hinged at one edge to the base of one side of the tank, and movable wedge-shaped supports holding said bottom in its closed position and causing it to open gradually, as set forth.

4. The combination of the filtering-tank formed with vertically-prolonged parallel side walls disposed in proximity to each other and provided with vertical draining-channels in their inner faces and liquid-exits at the bases of said channels, strainers extending across the channels, an imperforate bottom hinged at one edge to the base of one of said side walls, guides under the base of the opposite side wall, wedges sliding in said guides and sustaining the aforesaid bottom in its closed position, and a longitudinally-movable rod connected to the wedges to operate them simultaneously as set forth.

5. The combination of a plurality of filtering-tanks, each formed with vertically-prolonged side walls disposed in proximity to each other and provided with vertical draining-channels in the inner faces thereof and liquid-outlets at the bases of said channels, strainers extending across the channels, a bottom plate hinged at one edge to the base of one of the side walls of the tank, guides under the opposite side wall, wedges riding on said guides and supporting the bottom plate in its closed position and a longitudinally-movable rod connected to said wedges to operate them simultaneously, said tanks being disposed side by side with longitudinal beams between them, similar beams extending along the exteriors of the two outer tanks, tie-beams extending across the ends of the set of tanks and secured to the longitudinal beams, and a gutter extending around the base of the set of tanks and communicating with the aforesaid liquid-outlets as set forth and shown.

6. In combination with the tank A and the bottom B hinged at one of its edges to the base of one of the side walls of the tank, the guides $g\ g$ secured to the opposite side wall, the wedges $h\ h$ riding in said guides, the coupling-bar $i$ connected to said wedges, the bracket $n$ fixed to the base of the tank and the screw $o$ supported on said bracket and connected to the coupling-bar $i$ to move the same longitudinally as set forth.

In testimony whereof I have hereunto signed my name this 23d day of October, 1895.

KIRK S. BLANCHARD. [L. S.]

Witnesses:
J. J. LAASS,
C. L. BENDIXON.